United States Patent
Grimm

[11] Patent Number: 5,833,897
[45] Date of Patent: Nov. 10, 1998

[54] METHOD OF FORMING TOSSABLE DEVICE INCLUDING GAME-BALL UNIT

[75] Inventor: Thomas H. Grimm, Menlo Park, Calif.

[73] Assignee: OddzOn Products, Inc., Campbell, Calif.

[21] Appl. No.: 807,625

[22] Filed: Feb. 27, 1997

[51] Int. Cl.⁶ .......................... B29C 44/06; B29C 44/12
[52] U.S. Cl. ...................... 264/46.5; 264/46.7; 264/46.9; 264/271.1; 264/275; 264/278; 264/279.1; 428/316.6
[58] Field of Search ................... 264/46.5, 46.7, 264/46.9, 275, 278, 271.1, 279.1; 428/316.6

[56] References Cited

U.S. PATENT DOCUMENTS

| | | |
|---|---|---|
| 23,538 | 4/1859 | Arnold . |
| Re. 33,449 | 11/1990 | Martin . |
| D. 92,721 | 7/1934 | Jary . |
| D. 235,794 | 7/1975 | Kroener . |
| D. 288,216 | 2/1987 | Jensen . |
| D. 306,894 | 3/1990 | DeMarco . |
| D. 322,105 | 12/1991 | Ma . |
| D. 335,906 | 5/1993 | Hellerman . |
| D. 346,001 | 4/1994 | Stillinger et al. . |
| D. 348,907 | 7/1994 | Prentice et al. . |
| D. 350,577 | 9/1994 | Giudice . |
| D. 353,427 | 12/1994 | Wuesthoff . |
| D. 355,460 | 2/1995 | Routzong et al. . |
| D. 361,811 | 8/1995 | Grimm et al. . |
| 1,293,869 | 2/1919 | Murray et al. . |
| 1,296,403 | 3/1919 | Kindle . |
| 1,520,131 | 12/1924 | Jacob . |
| 1,718,508 | 6/1929 | White . |
| 2,183,152 | 12/1939 | Prensky et al. . |
| 2,338,719 | 1/1944 | Holt . |
| 2,432,209 | 12/1947 | Osgood . |
| 2,494,026 | 1/1950 | Anderson . |
| 2,608,027 | 8/1952 | Perker et al. . |
| 2,611,999 | 9/1952 | Mikolay . |
| 2,759,297 | 8/1956 | Lewis . |
| 2,763,958 | 9/1956 | Lemelson . |
| 2,870,570 | 1/1959 | Benson . |
| 2,989,782 | 6/1961 | Barkhuff, Jr. et al. ................. 264/46.4 |
| 3,079,644 | 3/1963 | Molitor et al. ............................ 264/246 |
| 3,147,011 | 9/1964 | Lemelson . |
| 3,190,654 | 6/1965 | Ross . |

(List continued on next page.)

FOREIGN PATENT DOCUMENTS

| | | |
|---|---|---|
| 2 508 804 | 7/1981 | France . |
| 900310 | 7/1949 | Germany . |
| 46-21958 | 6/1971 | Japan ................................... 264/46.9 |
| 60-242870 | 12/1985 | Japan . |
| 469863 | 9/1937 | United Kingdom . |

OTHER PUBLICATIONS

Barr Rubber Products Co., 1965 Athletic Ball Catalog, Mar. 10, 1965.
Parker Brothers Catalog, 1988.
Parker Brothers Catalog, 1991.

*Primary Examiner*—Allan R. Kuhns
*Attorney, Agent, or Firm*—Kolisch Hartwell Dickinson McCormack & Heuser

[57] ABSTRACT

A method of forming a ball-shaped unit including (1) molding an inner core subunit from a high-resilience, polyurethane foam material, (2) lining the wall of a mold cavity which is larger than such a formed inner core subunit with a thin film of an outer, skin-forming material—preferably a water-based, pigmented, acrylic emulsion, barrier release coating for urethane foam, (3) suspending the inner core subunit generally centrally within and circumsurroundedly spaced from the lined mold cavity wall, (4) filling the space intermediate the inner core subunit and the lined mold cavity wall with a soft, slow-return, polyurethane material thus to form an outer core subunit which encases the inner core subunit and which is encased by the skin-forming material, and (5) removing from the mold cavity, in the form of the desired ball-shaped unit, the assembly including the inner and outer core subunits and the skin-forming material.

10 Claims, 3 Drawing Sheets

U.S. PATENT DOCUMENTS

| | | | |
|---|---|---|---|
| 3,198,526 | 8/1965 | Smith et al. . | |
| 3,225,488 | 12/1965 | Goldfarb . | |
| 3,256,020 | 6/1966 | Smith . | |
| 3,292,879 | 12/1966 | Chilowsky . | |
| 3,373,730 | 3/1968 | Jenison . | |
| 3,437,340 | 4/1969 | Grise . | |
| 3,528,662 | 9/1970 | Merchant et al. . | |
| 3,746,334 | 7/1973 | Stubblefield . | |
| 3,909,976 | 10/1975 | Kirk . | |
| 3,940,145 | 2/1976 | Gentiluomo | 473/377 |
| 4,021,041 | 5/1977 | Goldfarb et al. . | |
| 4,088,319 | 5/1978 | Clarke . | |
| 4,109,411 | 8/1978 | Wetherell et al. . | |
| 4,112,613 | 9/1978 | Toplak . | |
| 4,142,720 | 3/1979 | Davis | 473/53 |
| 4,256,304 | 3/1981 | Smith et al. . | |
| 4,262,911 | 4/1981 | Opresik et al. . | |
| 4,274,637 | 6/1981 | Molitor | 264/46.9 |
| 4,294,447 | 10/1981 | Clark . | |
| 4,335,537 | 6/1982 | Walker . | |
| 4,339,138 | 7/1982 | Di Manno . | |
| 4,366,936 | 1/1983 | Ferguson . | |
| 4,436,276 | 3/1984 | Donahue | 264/46.9 |
| 4,438,924 | 3/1984 | Carr . | |
| 4,454,253 | 6/1984 | Murphy et al. | 521/112 |
| 4,460,423 | 7/1984 | Bosnia | 264/46.5 |
| 4,463,951 | 8/1984 | Kumasaka et al. | 473/601 |
| 4,531,737 | 7/1985 | Jacobson et al. . | |
| 4,537,405 | 8/1985 | Cymbler . | |
| 4,572,507 | 2/1986 | Hubbert et al. | 264/46.9 |
| 4,598,909 | 7/1986 | Ventura et al. . | |
| 4,610,071 | 9/1986 | Miller | 264/46.5 |
| 4,641,839 | 2/1987 | Turner . | |
| 4,657,253 | 4/1987 | Lerner et al. . | |
| 4,660,830 | 4/1987 | Tomar | 264/46.9 |
| 4,702,866 | 10/1987 | Krueger | 264/46.9 |
| 4,736,948 | 4/1988 | Thomas . | |
| 4,763,900 | 8/1988 | Carr . | |
| 4,772,020 | 9/1988 | Martin . | |
| 4,887,814 | 12/1989 | Winter . | |
| 4,919,422 | 4/1990 | Ma . | |
| 4,930,777 | 6/1990 | Holenstein . | |
| 4,943,066 | 7/1990 | Lathim et al. . | |
| 5,020,438 | 6/1991 | Brown . | |
| 5,045,011 | 9/1991 | Lovik . | |
| 5,066,017 | 11/1991 | Kurland . | |
| 5,123,659 | 6/1992 | Williams | 264/46.9 |
| 5,133,550 | 7/1992 | Handy . | |
| 5,228,690 | 7/1993 | Rudell et al. . | |
| 5,267,735 | 12/1993 | Bushman . | |
| 5,269,514 | 12/1993 | Adler et al. . | |
| 5,284,341 | 2/1994 | Routzong . | |
| 5,314,187 | 5/1994 | Proudfit | 273/235 R |
| 5,609,953 | 3/1997 | Tamura | 264/46.9 |

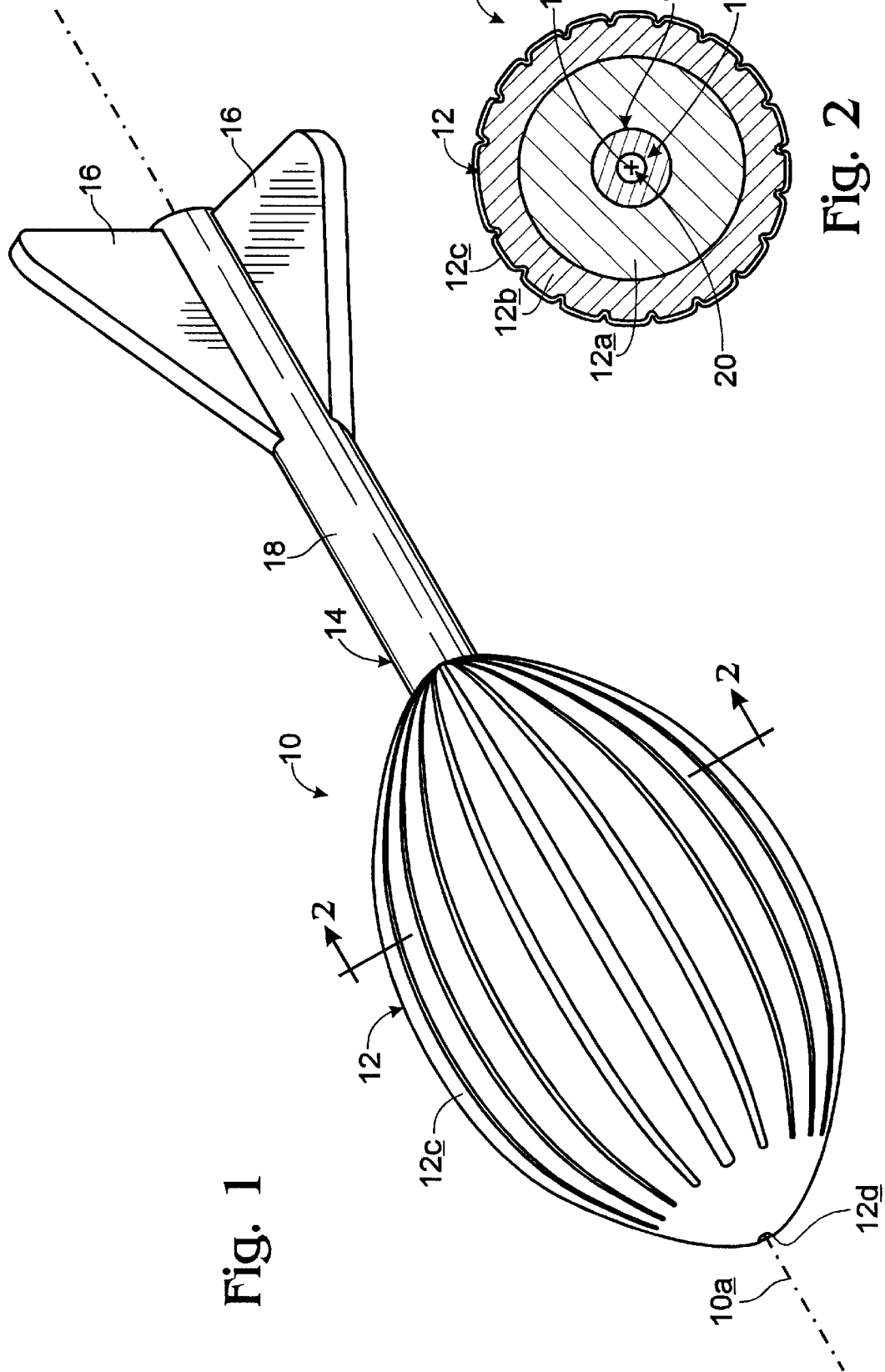

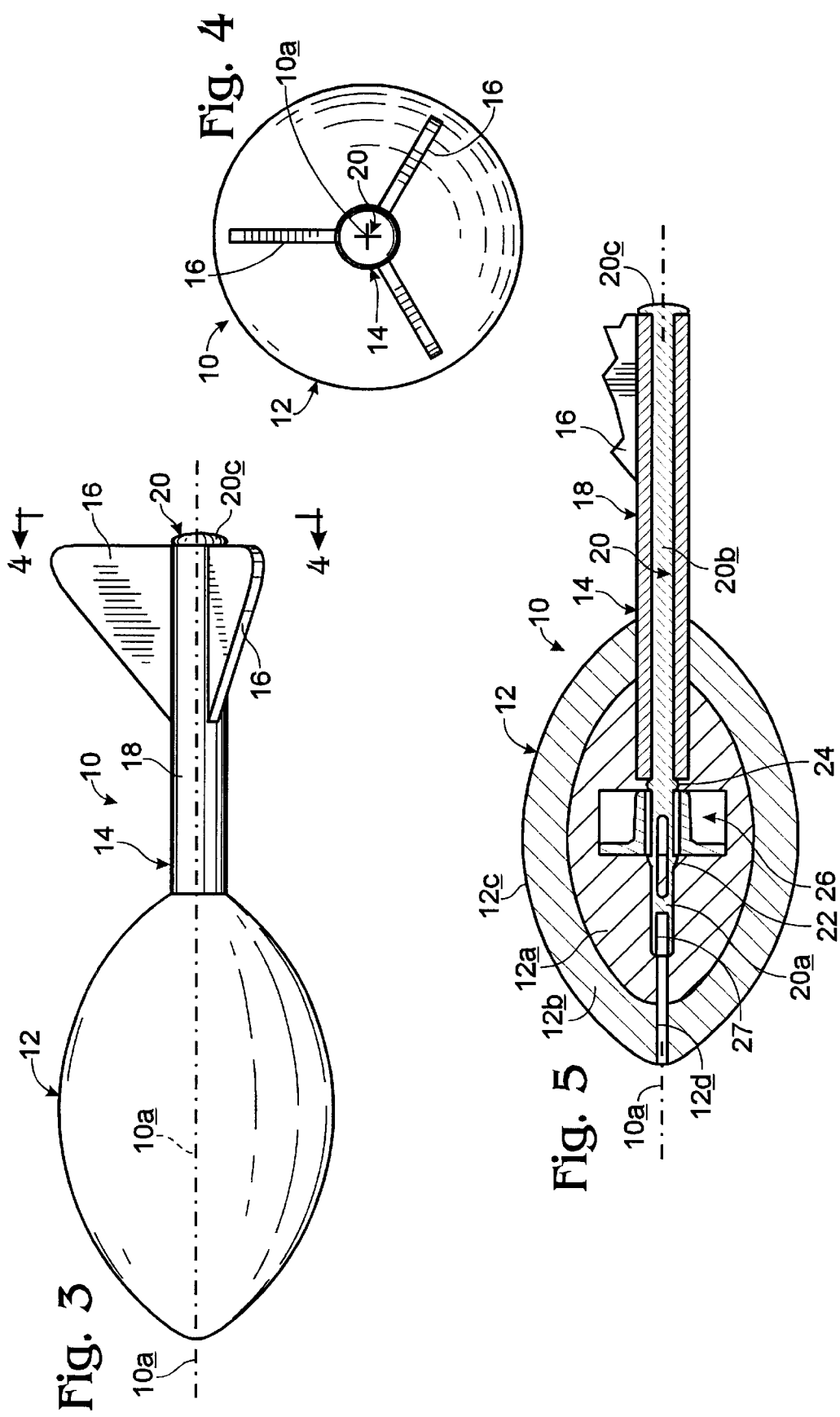

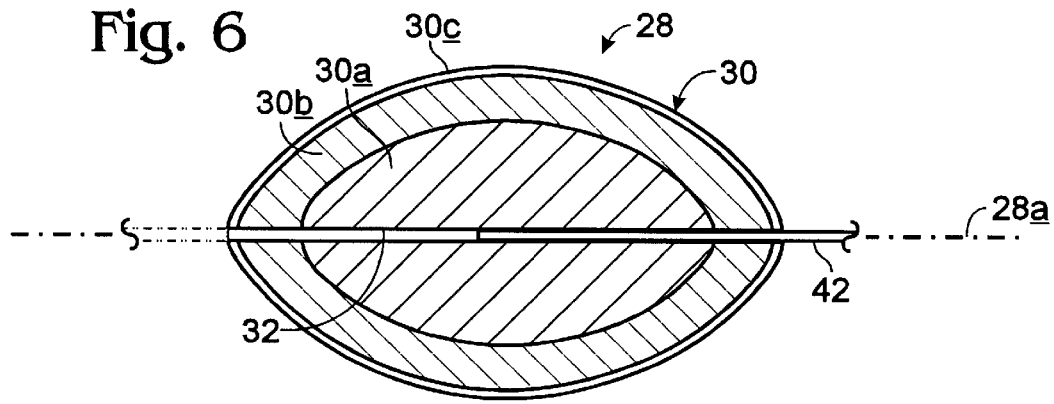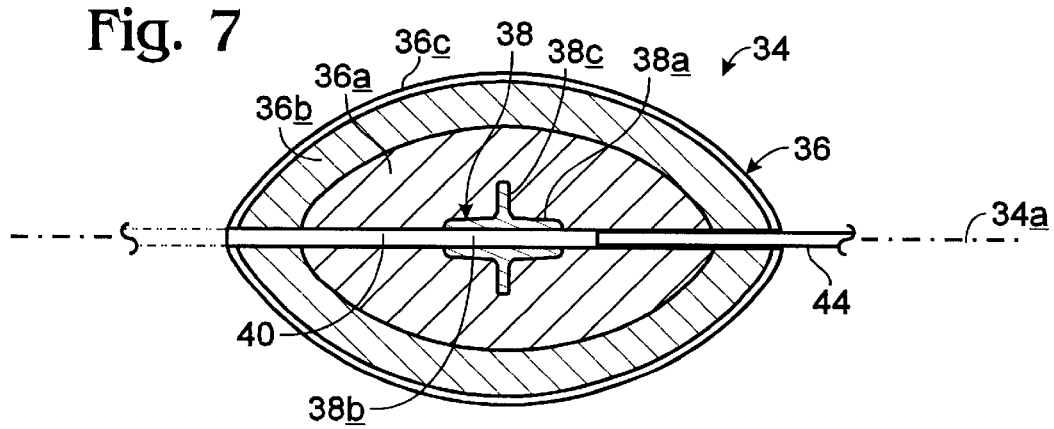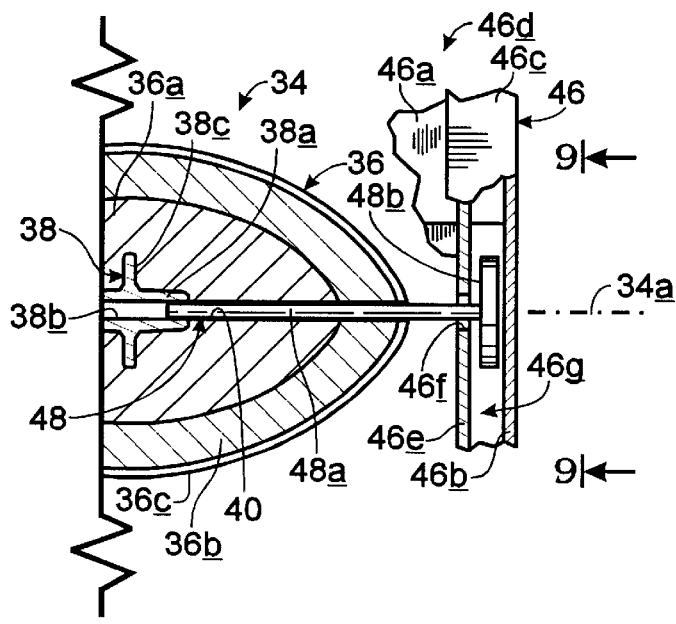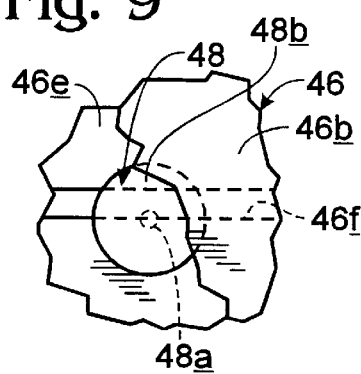

METHOD OF FORMING TOSSABLE DEVICE INCLUDING GAME-BALL UNIT

BACKGROUND AND SUMMARY OF THE INVENTION

This invention relates to a tossable device which includes a generally ball-shaped unit, and in particular it relates to a method for creating such a unit.

The method of this invention is described herein in relation to the making of three different device embodiments, one of which includes a generally football-shaped ball unit with an extending, finned tail structure, and the two other of which simply take the forms, from an external point of view, of generally football-shaped ball units.

A ball-like unit made in accordance with the procedure of the present invention features what might be thought of as a sandwich-of-revolution assembly which includes a fairly dense, high-resilience inner core subunit, a softer, more easily squeezable, spongy, energy-absorbing outer core subunit which encases and jackets the inner core subunit, and a relatively thin (typically about 2-mils) outer skin which is formed preferably of a high-frictioning, grip-enhancing material. This composite assembly results in a game-ball device which is very aesthetically pleasing and easy to throw and to catch, and which is also highly satisfactory in relation to its flight-performance capabilities.

Thus, an important object of the present invention is to provide a unique method for creating a tossable device including a ball-shaped unit having, generally, the core/skin structure outlined above.

Yet another object of the invention is to provide such a method which is simply and easily implemented utilizing, at least to some extent, fairly standard molding protocols which can be practiced at relatively low cost.

A further object of the invention is to provide a method which yields, as a final product, a ball-shaped unit which contains a central axial bore structure that promotes a unique way of packaging the overall structure for sale.

These and other features, objects and advantages which are attained by the invention will become more fully apparent as the description which now follows is read in conjunction with the accompanying drawings.

BRIEF DESCRIPTION OF THE DRAWINGS

FIG. 1 is a perspective view illustrating one embodiment of a tossable device including a ball-shaped unit which has been created in accordance with the unique methodology of the present invention.

FIG. 2 is a cross-sectional view taken generally along the line 2—2 in FIG. 1.

FIG. 3 is a reduced-scale, side elevation of the ball of FIG. 1, with external, elongate grooving that is formed on the outside of the ball-shaped unit omitted from this view.

FIG. 4 is an end view taken generally along the line 4—4 in FIG. 3.

FIG. 5 is a longitudinal cross section of the ball of FIG. 1–4, inclusive, with fin structure that forms part of a tail structure being shown only partially and fragmentarily.

FIG. 6 is a longitudinal cross section, on about the same scale employed in FIG. 1, illustrating another form of a ball-shaped unit which has been produced in accordance with the teachings of the present invention.

FIG. 7 is very much like FIG. 6, except that it illustrates a third form of ball-shaped unit produced in accordance with the present invention.

FIG. 8 pictures fragmentarily how a through-bore which is prepared in conjunction with the making of the unit pictured in FIG. 7 is employed cleverly to support that unit for anti-escape, but nevertheless otherwise easily handleable, display in sale-display packaging.

FIG. 9 is a fragmentary view taken generally along the line 9—9 in FIG. 8.

DETAILED DESCRIPTION OF THE INVENTION

I will begin my detailed description of this invention by discussing generally the structural forms of three different embodiments of a tossable device, each including a generally ball-shaped unit which has been created in accordance with the methodology of this invention. Accordingly, and beginning with attention directed particularly to FIG. 1–5, inclusive, indicated generally at 10 is a tossable device which includes a generally ball-shaped unit 12 (which herein takes the form of a football), and which further includes an elongate tail structure 14 that extends from one end of unit 12 generally centered on and along the long axis 10a, of the device. The tail structure in device 10 includes three, radially extending, equally angularly displaced, generally triangular, die-cut, cross-inked, polyethylene fins 16 which are suitably joined to an elongate, extruded, polyethylene, tubular spine 18. Spine 18 is carried on and bonded to a major portion of an elongate, polypropylene, molded stiffener 20 which will be more fully described shortly.

Unit 12 is made up of three components in accordance with this invention, including (1) a dense, molded, generally football-shaped, inner core subunit 12a which is formed preferably of a high-resilience, polyurethane foam, or the like, (2) a generally football-shaped, outer core subunit 12b which has been molded, as will be explained, to encase inner core subunit 12a, with this outer core subunit being formed preferably of a soft, spongy, slow-return, polyurethane foam, or the like, and (3) a thin, outer skin 12c which is formed preferably of a high-frictioning, grip-enhancing material—preferably a water-based, pigmented, acrylic emulsion, barrier release coating for urethane foam, or the like.

As can be seen particularly in FIG. 5, stiffener 20 includes one elongate finger-portion stretch 20a which is located toward the left end of the stiffener in that figure, joining with a much longer, other elongate stretch 20b that extends from within unit 12 outwardly to the right of the unit in FIG. 5 along axis 10a. Stretch 20a includes a pair of axially spaced shoulder units 22, 24 which are designed to capture (against axial escape), a molded stiffener cap 26 which has been slid onto the finger portion from the left end thereof in FIG. 5, which cap is shown captured and in place in FIG. 5 between these two shoulder units. Finger portion 20a also includes an elongate, longitudinal bore 27 which is aligned with axis 10a and also with a central bore 12d formed in unit 12 as will be explained. Bore 12d is referred to herein as a through-bore.

Further details of the device structure so far described and illustrated in FIGS. 1–5, inclusive, can be found in my co-pending U.S. patent application, Ser. No.08/807,644 covering TOSSABLE GAME-BALL DEVICE, filed Feb. 27, 1997. The entire contents of that patent application are hereby corporated herein by reference.

Turning attention now in particular to FIG. 6, here there is shown at 28 a tossable device including a generally football-shaped, ball-like unit 30. Unlike previously mentioned device 10, device 28 does not include an extending tail structure. Nevertheless, ball-like unit 30, as was true in the case of ball-like unit 12, includes an inner core subunit 30*a*, an outer core subunit 30*b*, and a skin-forming layer 30*c* which are like those very same elements found in unit 12, and which are formed, respectively, from the same selected categories of materials.

Extending along the long axis 28*a* of device 28 is an elongate through-bore 32 which comes into existence during the making of unit 30 in a manner which will be described shortly.

Structure shown in dash-double-dot lines projecting from the left end of unit 30 in FIG. 5, and fragmentarily in solid lines projecting from the right end in FIG. 6, will also be explained shortly.

Turning attention next to FIG. 7, here, at 34, is shown another form of tossable device made in accordance with the invention, including a generally football-shaped, ball-like unit 36. Unit 36 includes an inner core subunit 36*a*, an outer core subunit 36*b*, and a skin 36*c* which are formed of materials substantially the same as those described for the previously mentioned inner and outer core subunits and skins, respectively. The long axis of device 34 is shown at 34*a*.

Device 34 differs from previously mentioned device 28 principally in that it includes a central anchor element 38 which is centrally embedded within inner core subunit 36*a*. Anchor element 38 includes an elongate tubular portion 38*a* which includes an elongate central bore, or aperture, 38*b*, and a radially outwardly extending annular flange 38*c*, disposed generally centrally between the opposite ends of tubular portion 38*a*. Bore 38*b* extends on and along 34*a*, and opposite ends of bore 38*b* open to a through-bore 40 which extends axially centrally within unit 36 and which is like previously mentioned through-bore 32 in unit 30.

Shown projecting from axially opposite ends of unit 36 in FIG. 7 are elongate fragmentary dash-dot-line structure (left side) and fragmentary solid structure (right side), which showings are similar to those just mentioned above respecting what is pictured in FIG. 6.

Considering now the methodology proposed by the present invention, and beginning with a description of how the device of FIGS. 1–5, inclusive, is made, after assembly of tail structure 14, in accordance with the teachings set forth in the above-referred to co-pending patent application, an elongate, slender filament is inserted into bore 27, and the end of this "insert-assembled" structure containing stiffener cap 26 is inserted into a suitable mold cavity which is designed to form inner core subunit 12*a*. Utilizing a high-resilience, polyurethane foam material, or the like, such material is introduced into such a mold cavity employing a conventional molding protocol, and the inner core subunit is thus formed with the stiffener-cap end of tail structure 14, accordingly, insert-molded into the inner core subunit, and with the filament just mentioned extending from that end of the subunit which is opposite the extending tail structure.

Next, the wall of a mold cavity which is designed to promote formation of outer core subunit 12*b* is suitably lined/coated with a thin film of an outer, skin-forming material—preferably a water-based, pigmented, acrylic emulsion, barrier release coating for urethane foam, or the like. Such a skin material is sold and made available by Akzo Nobel Coatings, Inc. of Somerset, N.J.—which material, that company refers to generically as an in-mold barrier coating material. With the wall of this second-mentioned mold cavity thus appropriately lined with the skin-forming material mentioned, the inner core subunit with tail assembly and extending filament is suitably suspended generally centrally within and circumsurroundedly spaced from the lined cavity wall, and the space intermediate the inner core subunit and the lined mold cavity wall is then appropriately filled in a conventional manner with a soft, spongy, slow-return, polyurethane foam material, thus to form outer core subunit 12*b*. Such formation results in the outer core subunit encasing the inner core subunit and being encased by the skin-forming material.

The entire molded assembly is then removed from the second-mentioned mold cavity, the filament is pulled free to leave bore 12*d*, and that completes formation of device 10.

Device 28 (FIG. 6) is formed by extending an elongate, central support filament (like the one above mentioned), shown fragmentarily at 42 on the right side of FIG. 6, axially centrally within a mold cavity designed to create inner core subunit 30*a*. With this situation established, a high-resilience, polyurethane foam material, like that mentioned several times above, is introduced into this mold cavity to form inner core subunit 30*a* on and about filament 42.

The combined inner core subunit and filament 42 are then removed from the just-mentioned mold cavity, and this partial construction is introduced into a second mold cavity, after lining the wall of the same with a selected thin film of a skin-forming material like that mentioned above. Inner core subunit 30*a* is suspended generally centrally within this second-mentioned cavity, with opposite end portions of filament 42 appropriately seated near axially opposite ends of the second-mentioned cavity.

Next, a soft, slow-return, spongy, polyurethane foam material is introduced into the space within this second-mentioned cavity between the skin-forming material and the inner core subunit, thus to form outer core subunit 30*b* in a condition encasing inner core subunit 30*a* and encased by skin material 30*c*.

The entire assembly is then released from the second-mentioned mold cavity, and filament 42 is withdrawn axially to leave through-bore 32. The dash-double-dot and solid lines appearing at opposite ends of device 28 in FIG. 6 represent filament 42. The reason for, and functionality of, through-bore 32 will be described shortly.

Production of device 34 is substantially identical to that just described for device 28, with the exception that, prior to molding, anchor element 38 is slid onto an elongate support filament 44 which is like previously mentioned filament 42. This slid-together assembly is suspended suitably within a mold cavity designed to form inner core subunit 36*a*, with element 38 centrally positioned therein. The procedural steps thereafter followed are identical to those just described above for the formation of device 28.

The clever molding-in, so-to-speak, of through-bores in devices 10, 28, 34 offers the opportunity, as will now be briefly described, to promote and allow captured display packaging which nevertheless allows for pre-purchase touch access to the devices held within their display packagings. This situation is generally illustrated in FIGS. 8 and 9 in relation to device 34, and will be described only in writing hereinbelow in relation to devices 10 and 28. Shown fragmentarily at 46 is an end portion of cardboard display packaging which houses device 34. In very general terms, this packaging includes a back panel 46*a*, in front of which device 34 is positioned, end panels, such as right-end panel 46*b*, and a front panel structure 46*c* which includes a football-silhouette-shaped window shown partially at 46*d*, and a pair of inner end flaps, such as flap 46*e*, which contain forwardly extending elongate slots, such as slot 46*f*. Each such flap is closely spaced inwardly relative to an adjacent end panel, and such a space is shown at 46*g* in FIG. 8 between end panel 46*b* and flap 46*e*.

Provided for supporting device 34 within packaging 46 are two end support wafer and post spindle units, one of which is shown at 48 in FIGS. 8 and 9. Each spindle unit includes an elongate post, such as post 48a which extends slideably into through-bore 40 and slightly, in a jam-fit manner, into an end of bore 38b, and an outwardly exposed, generally circular end wafer, such as wafer 48b. The posts in these spindle units extend through, and rest on edges of, slots, such as slot 48f, and the wafers reside captured between the immediately adjacent end panels and spaced parallel flaps.

This display arrangement, with window 46d open and unblocked by any other structure, permits a would-be purchaser to handle and somewhat to manipulate device 34 while the latter remains securely captured within the packaging. Unit 36, so packaged, is permitted only a very minimal amount axial movement because of the ways in which the posts in the spindle units fit into the opposite ends of the bore in anchor element 38. In other words, unit 36 is not free to slide back and forth along these posts.

A device like device 28 is supportable within display packaging with a slight difference in that, because there is no central anchor element within unit 28, a device, like device 28, so supported in packaging can be slid back and forth axially within the limits afforded by the spacing between the inner flaps, such as flap 46e, and can also be rotated.

A device like device 10 is supported in display packaging using only one spindle unit whose post extends into bore 12d, and in a jam-fit manner into the open end of bore 27 in finger portion 20a.

Accordingly, a method for forming several varieties of tossable devices, and in particular a method of forming a generally ball-shaped unit in each of such devices, has been described herein in relation to several illustrated devices themselves. Fundamentally, the three principal elements of each ball-like unit—the inner core subunit, the outer core subunit, and the skin—can be thought of as taking the form of a sandwich-of-revolution, ball-like assembly. The method of the invention which allows for the creation of elongate, slender, axial through-bores, promotes a unique type of display packaging. Such packaging is further described in my co-pending U.S. patent application Ser. No 08/807,622 for ARTICLE PACKAGING, filed Feb. 27, 1997, and the entirety of the disclosure in that co-pending patent application is hereby incorporated herein by reference.

Variations and modifications may well become apparent to those skilled in the art, and all of these variations and modifications are believed to come within the scope of the present invention.

It is claimed and desired by Letters Patent:

1. In relation to the making of a tossable device which includes a generally ball-shaped unit, a method for creating such a unit comprising forming, by molding, an inner core subunit utilizing a high-resilience, polyurethane foam material, lining the wall of a mold cavity which is larger than such a formed inner core subunit with a thin film of an outer, skin-forming material, suspending the inner core subunit generally centrally within, and circumsurroundedly spaced from, the lined mold cavity wall, filling the space intermediate the inner core subunit and the lined mold cavity wall with a soft, slow-return spongy polyurethane foam material, thus to form an outer core subunit encasing the inner core subunit and encased by the skin-forming material, and removing from the mold cavity, in the form of the desired ball-shaped unit, the assembly including the inner and outer core subunits and the skin-forming material.

2. The method of claim 1, wherein forming of such an inner core subunit is accomplished by molding the same on and about an elongate filament, with at least one end of that filament extending from one side of the finally molded, inner core subunit.

3. The method of claim 1, wherein forming of such an inner core subunit is accomplished by molding the same on and about an elongate central support filament, with opposite ends of that filament extending exposed from opposite sides of the finally molded, inner core subunit.

4. The method of claim 3, wherein said suspending step is performed by seating opposite end portions of such a support filament in the lined mold cavity.

5. The method of claim 4, wherein, following removal of the ball-shaped unit from the mentioned mold cavity, the filament is withdrawn longitudinally from the unit, thus to leave a centrally extending through-bore in the unit.

6. The method of claim 1, wherein forming of such an inner core subunit is accomplished by sliding an apertured central anchor element onto and between the ends of an elongate, central support filament which extends through the aperture in the anchor element, and molding the subunit on and about the combination of the element and the filament, with the element becoming centrally embedded in the finally molded, inner core subunit, and with the opposite ends of the filament extending exposed from opposite sides of the finally molded subunit.

7. The method of claim 6, wherein said suspending step is performed by seating opposite end portions of such a support filament in the lined mold cavity.

8. The method of claim 7, wherein, following removal of the ball-shaped unit from the mentioned mold cavity, the filament is withdrawn longitudinally from the unit, thus to leave the anchor element within the unit, and a centrally extending bore having portions communicating with opposite-ends of the aperture in the element, and with each such portion opening to an opposite side of the completed unit.

9. The method of claim 1, further comprising selecting (1) the high-resilience, polyurethane foam, (2) the soft, slow-return, polyurethane foam and (3) a water-based, pigmented, acrylic emulsion, barrier release coating for urethane foam, and creating a sandwich-of-revolution, ball-like assembly with selected material (1) circumsurroundedly encased by selected material (2), and selected material (2) circumsurroundedly encased by selected material (3).

10. The method of claim 1, wherein the skin-forming material is a water based, pigmented, acrylic emulsion, barrier release coating for urethane foam.

* * * * *